United States Patent
Batcheller et al.

(10) Patent No.: US 9,474,208 B2
(45) Date of Patent: Oct. 25, 2016

(54) SYSTEM AND METHOD FOR DETERMINING MATERIAL YIELD AND/OR LOSS FROM A HARVESTING MACHINE USING ACOUSTIC SENSORS

(71) Applicant: Appareo Systems, LLC, Fargo, ND (US)

(72) Inventors: Barry D. Batcheller, West Fargo, ND (US); Joshua N. Gelinske, Fargo, ND (US); Peder A. Nystuen, Fargo, ND (US); Adam A. Reich, Fargo, ND (US)

(73) Assignee: Appareo Systems, LLC, Fargo, ND (US)

( * ) Notice: Subject to any disclaimer, the term of this patent is extended or adjusted under 35 U.S.C. 154(b) by 885 days.

(21) Appl. No.: 13/678,441

(22) Filed: Nov. 15, 2012

(65) Prior Publication Data

US 2014/0135082 A1    May 15, 2014

Related U.S. Application Data

(60) Provisional application No. 61/560,201, filed on Nov. 15, 2011.

(51) Int. Cl.
*A01F 12/16* (2006.01)
*A01D 41/127* (2006.01)

(52) U.S. Cl.
CPC ....... *A01D 41/1275* (2013.01); *A01D 41/1273* (2013.01)

(58) Field of Classification Search
CPC ........... A01D 41/127; A01D 41/1271; A01D 41/1272; A01D 41/1273; A01D 41/1275; A01D 41/1277

USPC .......................................................... 460/5
See application file for complete search history.

(56) References Cited

U.S. PATENT DOCUMENTS 3,610,252 A * 10/1971 De Coene .......... A01D 41/1273
                                                          460/1
3,639,755 A    2/1972  Wrege
(Continued)

FOREIGN PATENT DOCUMENTS

DE    102007005889    7/2008
DE    102008052442    6/2009
(Continued)

OTHER PUBLICATIONS

"International Search Report and Written Opinion", PCT/US2015/023415, Jul. 2, 2015.
(Continued)

*Primary Examiner* — Thomas B Will
*Assistant Examiner* — Joan D Misa
(74) *Attorney, Agent, or Firm* — Law Office of Mark Brown, LLC; Mark E. Brown (57) ABSTRACT

A system and method for determining material yield and/or loss from a harvesting machine using acoustic sensors and advanced signal processing capabilities is presented. The system consists of a sensor housing with an opening on one side of the sensor housing, a strike plate designed to fit into the opening, and an electronics module comprising a microphone and a signal processor designed to capture the sound waves created when material impacts on the strike plate, and convert them into an audio signal indicating the amount of material impacting the sensor at a given time.

12 Claims, 9 Drawing Sheets

(56) References Cited

U.S. PATENT DOCUMENTS

| | | | |
|---|---|---|---|
| 3,935,866 A * | 2/1976 | Northup | A01D 41/1273 460/4 |
| 4,057,709 A | 11/1977 | Lyngsgaard et al. | |
| 4,275,546 A * | 6/1981 | Bohman | A01D 75/187 460/2 |
| 4,296,409 A * | 10/1981 | Whitaker | G07C 5/0825 340/459 |
| 4,348,855 A | 9/1982 | DePauw et al. | |
| 4,360,998 A * | 11/1982 | Somes | A01D 41/1271 460/5 |
| 4,441,513 A | 4/1984 | Herwig | |
| 4,517,792 A * | 5/1985 | Denning | A01D 41/1273 460/5 |
| 4,651,331 A | 3/1987 | Harrsen et al. | |
| 4,697,173 A | 9/1987 | Stokes | |
| 4,900,881 A | 2/1990 | Fischer | |
| 4,902,264 A * | 2/1990 | Diekhans | A01D 41/1273 460/5 |
| 4,922,467 A * | 5/1990 | Caulfield | G01V 1/001 367/135 |
| 4,961,304 A | 10/1990 | Ovsborn et al. | |
| 5,015,997 A * | 5/1991 | Strubbe | A01D 41/1273 340/684 |
| 5,312,299 A * | 5/1994 | Behnke | G01F 1/666 460/5 |
| 5,802,489 A | 9/1998 | Orbach et al. | |
| 5,828,626 A * | 10/1998 | Castile | G08B 21/084 340/553 |
| 5,831,539 A | 11/1998 | Thomas et al. | |
| 5,831,542 A | 11/1998 | Thomas et al. | |
| 5,837,906 A * | 11/1998 | Palmer | G01F 1/66 73/861.73 |
| 5,924,371 A | 7/1999 | Flamme et al. | |
| 6,070,538 A | 6/2000 | Flamme et al. | |
| 6,093,926 A | 7/2000 | Mertins et al. | |
| 6,146,268 A * | 11/2000 | Behnke | A01D 41/1273 460/4 |
| 6,275,231 B1 | 8/2001 | Obradovich | |
| 6,296,425 B1 | 10/2001 | Memory et al. | |
| 6,386,128 B1 | 5/2002 | Svoboda et al. | |
| 6,524,183 B1 | 2/2003 | Van Quekelberghe | |
| 6,801,942 B1 | 10/2004 | Dietrich et al. | |
| 6,863,604 B2 * | 3/2005 | Behnke | A01D 41/127 460/6 |
| 6,925,357 B2 | 8/2005 | Wang et al. | |
| 7,001,267 B2 * | 2/2006 | Behnke | A01D 41/127 460/6 |
| 7,131,614 B2 | 11/2006 | Kisak et al. | |
| 7,162,962 B2 | 1/2007 | Fuessel et al. | |
| 7,415,365 B2 * | 8/2008 | Jeppe | A01D 41/1273 56/10.2 C |
| 7,654,141 B2 * | 2/2010 | Behnke | A01D 41/1273 73/584 |
| 7,751,946 B2 | 7/2010 | Taki et al. | |
| 8,095,278 B2 | 1/2012 | Schaaf et al. | |
| 8,154,227 B1 | 4/2012 | Young et al. | |
| 8,239,087 B2 | 8/2012 | Dybalski et al. | |
| 8,295,992 B2 | 10/2012 | Ecton et al. | |
| 8,332,093 B2 | 12/2012 | Yamasaki et al. | |
| 8,656,081 B2 | 2/2014 | Irizarry | |
| 8,667,206 B2 | 3/2014 | Irizarry | |
| 2002/0046322 A1 | 4/2002 | Butterworth et al. | |
| 2002/0140548 A1 | 10/2002 | Lutter et al. | |
| 2004/0186597 A1 * | 9/2004 | Wippersteg | A01D 41/127 700/31 |
| 2004/0203370 A1 | 10/2004 | Luo et al. | |
| 2005/0091593 A1 | 4/2005 | Peltz | |
| 2005/0143153 A1 * | 6/2005 | Behnke | A01F 12/52 460/4 |
| 2005/0280524 A1 | 12/2005 | Boone et al. | |
| 2006/0155429 A1 | 7/2006 | Boone et al. | |
| 2007/0143482 A1 | 6/2007 | Zancho | |
| 2007/0238491 A1 | 10/2007 | He | |
| 2008/0208395 A1 | 8/2008 | Self et al. | |
| 2008/0318648 A1 * | 12/2008 | Baumgarten | A01D 41/1273 460/5 |
| 2009/0251366 A1 | 10/2009 | McClure et al. | |
| 2009/0323578 A1 | 12/2009 | Hogenmueller et al. | |
| 2010/0097239 A1 | 4/2010 | Campbell et al. | |
| 2010/0293303 A1 | 11/2010 | Choi | |
| 2011/0086668 A1 | 4/2011 | Patel | |
| 2011/0106333 A1 | 5/2011 | Scheider et al. | |
| 2011/0224843 A1 | 9/2011 | Kalhous et al. | |
| 2012/0036914 A1 | 2/2012 | Landphair et al. | |
| 2012/0042815 A1 | 2/2012 | Wonderlich | |
| 2012/0072533 A1 | 3/2012 | O'Neil | |
| 2012/0109446 A1 | 5/2012 | Yousefi et al. | |
| 2012/0169874 A1 | 7/2012 | Thomas et al. | |
| 2012/0227647 A1 * | 9/2012 | Gelinske | G01F 1/666 111/174 |
| 2012/0256763 A1 | 10/2012 | Johnson et al. | |
| 2012/0271489 A1 | 10/2012 | Roberts et al. | |
| 2013/0008361 A1 | 1/2013 | Trevino et al. | |
| 2013/0211628 A1 | 8/2013 | Thurow et al. | |
| 2014/0033058 A1 | 1/2014 | Perotti | |
| 2014/0163771 A1 | 6/2014 | Demeniuk | |

FOREIGN PATENT DOCUMENTS

| | | | |
|---|---|---|---|
| EP | 0702890 | 3/1996 | |
| GB | 1514274 A * | 6/1978 | A01D 41/1273 |
| JP | 2003309584 | 10/2003 | |
| JP | 2005153684 | 6/2005 | |
| JP | 2005191819 | 7/2005 | |
| JP | 2005236560 | 9/2005 | |
| JP | 2008149755 | 7/2008 | |
| JP | 2011120540 | 6/2011 | |
| WO | 2008110413 | 9/2008 | |

OTHER PUBLICATIONS

"International Search Report and Written Opinion", PCT/US2014/030417, pp. 1-22.

"Air Seeder Blockage Monitoring and Balancing", *Appareo Systems—A Briefing for Amity Technology*, (Nov. 30, 2010),1-45.

"Air Seeder Monitor", *Installation & Operation Instructions air seeder monitor 1020* www.farmscan.net, (Apr. 2006),1-22.

"Amity Technology", www.amitytech.com Retrieved from the Internet Aug. 19, 2010.

"International Search Report and Written Opinion", PCT/US2012/028795, (Jun. 1, 2012).

Stone, M. L., et al., "Evolution of Electronics for Mobile Agricultural Equipment", *American Society of Agricultural and Biological Engineers* ISSN 0001-2351 vol. 51(2), (2008),385-390.

"AFS Concord air seeder monitors planting and fertilization from inside the cab", ASABE, Resource Magazine's 1999 AE50 Award Winner, Jun. 1999, 49.

"Translation of PCT Application PCT/EP2008/051411", Sep. 18, 2008.

Hest, "IAS enhances iPad based seed monitoring system", Farm Industry News, http://farmindustrynews.com/precision-farming/ias-enhances-ipad-based-seed-monitoring-system, Jan. 20, 2012, 1-2.

Hest, "Precision Planting launches iPad monitor application", Farm Industry News; http://farmindustrynews.com/precision-farming/precision-planting-launches-ipad-monitor-application, Jan. 30, 2012, 1-2.

* cited by examiner

SYSTEM AND METHOD FOR DETERMINING MATERIAL YIELD AND/OR LOSS FROM A HARVESTING MACHINE USING ACOUSTIC SENSORS

CROSS-REFERENCE TO RELATED APPLICATION

This application claims priority in U.S. Patent Application Ser. No. 61/560,201, filed Nov. 15, 2011, and is related to U.S. patent application Ser. No. 13/046,549 entitled Air Seeder Monitoring and Equalization System Using Acoustic Sensors, filed Mar. 11, 2011, which are both incorporated herein by reference.

BACKGROUND OF THE INVENTION

1. Field of the invention

The present invention relates generally to a system for detecting the amount of crop material present in an agricultural machine, and more particularly to a system using one or more acoustic sensors which can be used for detecting the amount of crop lost from a harvester, as well as the amount of crop yielded by the harvester.

2. Description of the Related Art

An agricultural combine, also referred to as a harvester, is a vehicle used to gather a crop from a field once the crop has reached maturity. The combine is driven through a field, and the plants (crop) in that field are pulled into an attachment called a header on the front of the machine. As the plants are pulled into the header, they are cut and fed into a threshing unit internal to the combine. In general terms, the threshing unit forces the cut plants to be rubbed between a rotating drum, or rotor, and a concave surface in order to separate the nutrient component (such as grain) from the remainder of the plant (the chaff). Most of the separated grain falls below the drum to a set of sieves, and then through the sieves where it is collected and transported via an elevator to a grain tank. The chaff material is passed over a series of conveyors called "straw walkers" which move the chaff toward the back of the machine. Air is blown through the sieves and the straw walkers, and the chaff is blown up off of the straw walkers and out the back of the combine. Some additional grain that remains in the chaff as it moves over the straw walkers, being heavier than the chaff and less susceptible to the blowing air, will fall through into the sieves to be collected in the grain tank.

The settings on the combine, and in particular the settings of the sieves in the combine, can, if not properly adjusted, cause amounts of grain to be lost out the back of the combine along with the chaff, resulting in lower crop yields. In addition, factors such as the speed of the combine through the field, ambient environmental conditions, crop moisture content, and crop type can affect the amount of crop that is lost during the harvesting process. In order to know how to adjust the combine settings properly, the operator needs to have an indication of how much crop is being lost at any given moment. This information is typically gathered through the use of a grain loss sensor, which is capable of detecting when crop material is being lost out the back of the combine, and can distinguish crop material from waste material (such as chaff).

A typical grain loss sensor utilizes a piezoelectric pad or membrane, typically located at the back of the sieves where material is falling or being blown out of the combine. Although both grain material and chaff material are ejected from the back of the combine, the grain is generally heavier and falls closer to the back of the machine, while the lighter chaff is blown farther away. The piezoelectric pad is placed close to the back of the machine, pad facing up, such that falling crop or kernels of grain, rather than chaff, will strike the pad. When the kernels impact the sensor, the deformation of the piezoelectric pad generates a measurable voltage due to piezoelectric effect, which electrical signals can be detected and interpreted as the presence of lost crop material.

Piezoelectric grain loss sensors suffer from several disadvantages. Since a portion of the piezoelectric pad has to be deformed by the grain strikes in order to be detected, the piezoelectric material must cover the entire surface where detection is required. However, to cover the entire width of the back of a combine, a very large piezoelectric pad would be required to cover the span and depth of the area. This would result in a very expensive sensor. Instead, combine manufacturers typically install two or three smaller sensors in key areas at the rear of the vehicle where the heaviest flow of material is expected. As a combine moves and tilts while operating on a sloping surface, the sensors often move out of these expected material flow zones, and the grain loss rates measured are artificially low.

Also, since a direct strike is required, the piezoelectric material itself must be exposed to the elements, and is exposed not only to being struck by grain, rocks, and other material, but also to the direct sun, precipitation, dust, and extremes in temperature. As a result, the sensors must frequently be cleaned, repaired, and replaced.

Existing piezoelectric sensors have a very limited ability to distinguish between types of material hitting their surfaces. Most of these prior art sensors will count a pebble or rock hit as a grain hit. This also limits the ability of the piezoelectric sensors to provide accurate loss rates.

The ideal technology for implementing a grain loss sensor would be flexible enough so that it could be adapted for use as a yield sensor in the same combine. A yield sensor is used to measure the amount of material that is harvested and successfully captured in the grain tank. This information is best captured in real-time, as an amount of material or flow rate, so that yield mapping applications can be implemented. A yield-mapping application combines information on the instantaneous flow rate of material with location information (such as that from a GNSS system such as GPS) to create a map showing amount of material (yield) mapped to specific locations in the field. The yield map can then be used by the farmer or operator to determine where and in what amounts to apply chemicals (such as fertilizers, pesticides, etc.) to boost the overall output of the field.

Unfortunately, a piezoelectric sensor is not well suited for measuring yield. The piezoelectric sensor could be placed at the top of the clean grain elevator, where grain is delivered (typically by chain-driven paddles moving up an enclosed elevator shaft). However, the amounts of material hitting the piezoelectric sensor would quickly overwhelm the sensitivity capabilities of the sensor, and the constant pummeling of material against the pad would likely damage or wear out the sensor quickly. Some combines use mechanical means for sensing yield, such as causing a flap to be pushed open to varying degrees by the material flowing into the grain tank based on the amount of material present. These mechanical sensing means for yield are inaccurate and subject to breakdown.

What is needed in the art is a new type of material sensing technology which can overcome the limitations described above associated with piezoelectric sensors, yet which is flexible enough to allow it to be adapted for use in yield sensing.

SUMMARY OF THE INVENTION

In accordance with the teachings of the present invention, a system and method for determining material yield and/or loss from a harvesting machine using acoustic sensors and advanced signal processing capabilities is disclosed.

In one aspect of the invention, a material loss sensor is disclosed, comprising a sensor housing with a first opening on a first side of the sensor housing, a strike plate designed to fit into the first opening on the first side of the sensor housing, and an electronics module comprising a microphone and a signal processor wherein the strike plate forms an environmental seal against the sensor housing, the electronics module extends at least partially into the sensor housing, the microphone is capable of detecting sound waves generated by the impact of particles on an exterior surface of the strike plate, the microphone converts the sound waves into a raw data signal and sends the raw data signal to the signal processor, and the signal processor processes the raw data signal and determines which portions of raw data signal correspond to the particle impacts and converts this information into an amount of material impacting the strike plate.

In another aspect of the invention, a material yield sensor comprising a sensor housing with a first opening on a first side of the sensor housing, a strike plate designed to fit into the first opening on the first side of the sensor housing, and an electronics module comprising a microphone and a signal processor wherein the strike plate forms an environmental seal against the sensor housing, the electronics module extends at least partially into the sensor housing, the microphone is capable of detecting sound waves generated by the impact of particles on an exterior surface of the strike plate, the microphone converts the sound waves into a raw data signal and sends the raw data signal to the signal processor, and the signal processor processes the raw data signal and determines the amount of sound power represented by the raw data signal and converts this information into a relative amount of material impacting the strike plate.

DETAILED DESCRIPTION OF THE PREFERRED EMBODIMENTS

With reference now to the drawings, and in particular to FIGS. 1 through 8 thereof, a new acoustic-based material sensing system embodying the principles and concepts of the present invention will be described.

Figure 1:
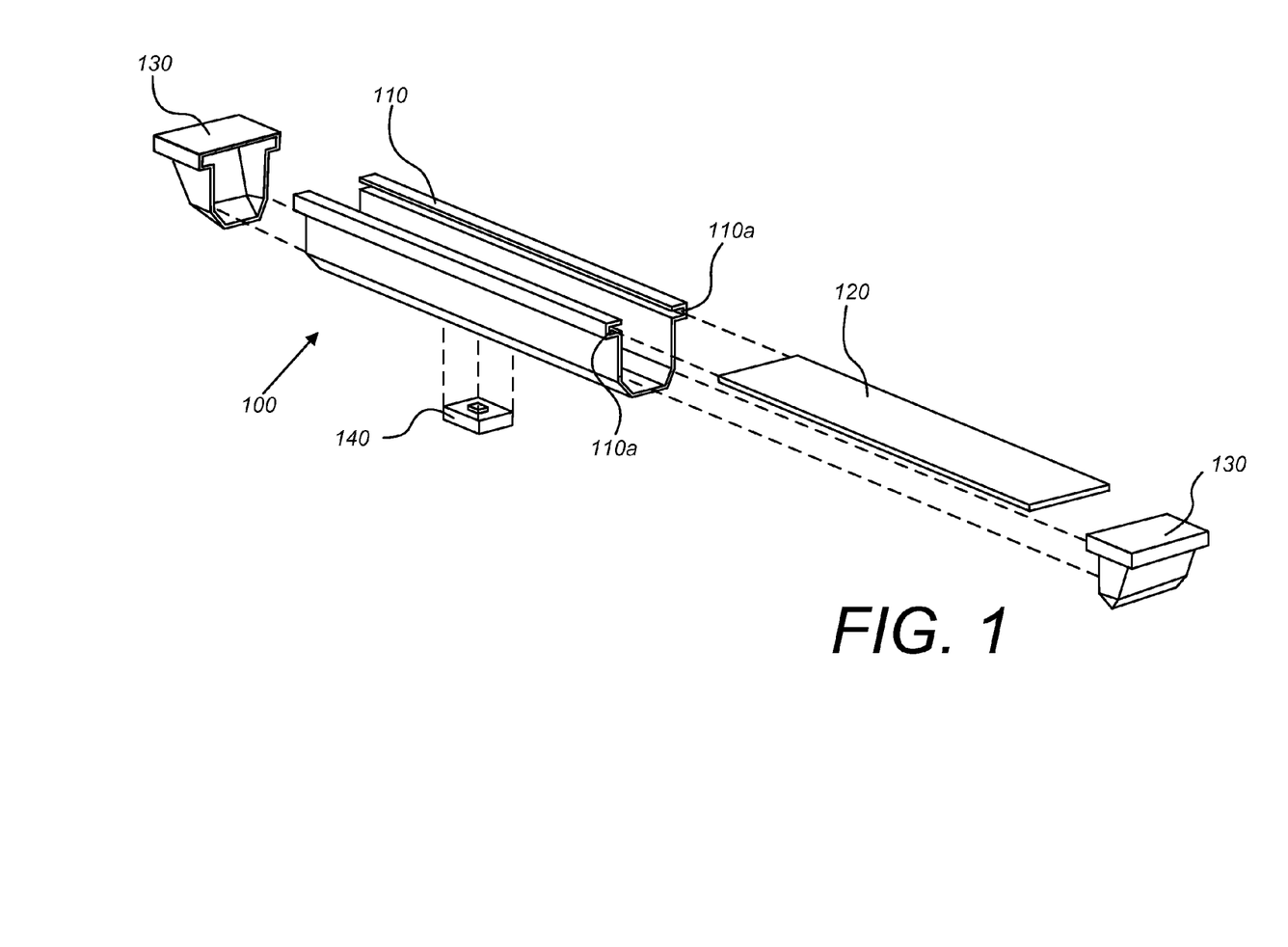
FIG. 1 shows an exploded isometric view of one embodiment of an acoustic grain loss sensor.

FIG. 1 shows an isometric view of one embodiment of an acoustic grain loss sensor 100. FIG. 1 is shown as an exploded view to better illustrate the construction of the grain loss sensor, as one distinct advantage of this sensor over prior art grain loss sensors is the simplicity and ruggedness of its construction.

In the embodiment of the acoustic grain loss sensor 100 shown in FIG. 1, a sensor case 110 forms an acoustic cavity through which sound waves can travel. The sensor case 110 is created such that it has small channels 110a on either side of its top surface such that a sensor strike plate 120 can be slid into place and held securely in channels 110a. Two sensor end caps 130 are placed at either end of the sensor case 110, completing the housing assembly and holding the sensor strike plate 120 in place. Finally, an electronics module 140, containing a microphone and other electronic components (detailed in later figures) is mounted into an opening in the bottom of the sensor case 110 such that the acoustic grain loss sensor 100 is environmentally sealed and such that the microphone extends up into the sensor case 110.

Figure 2:
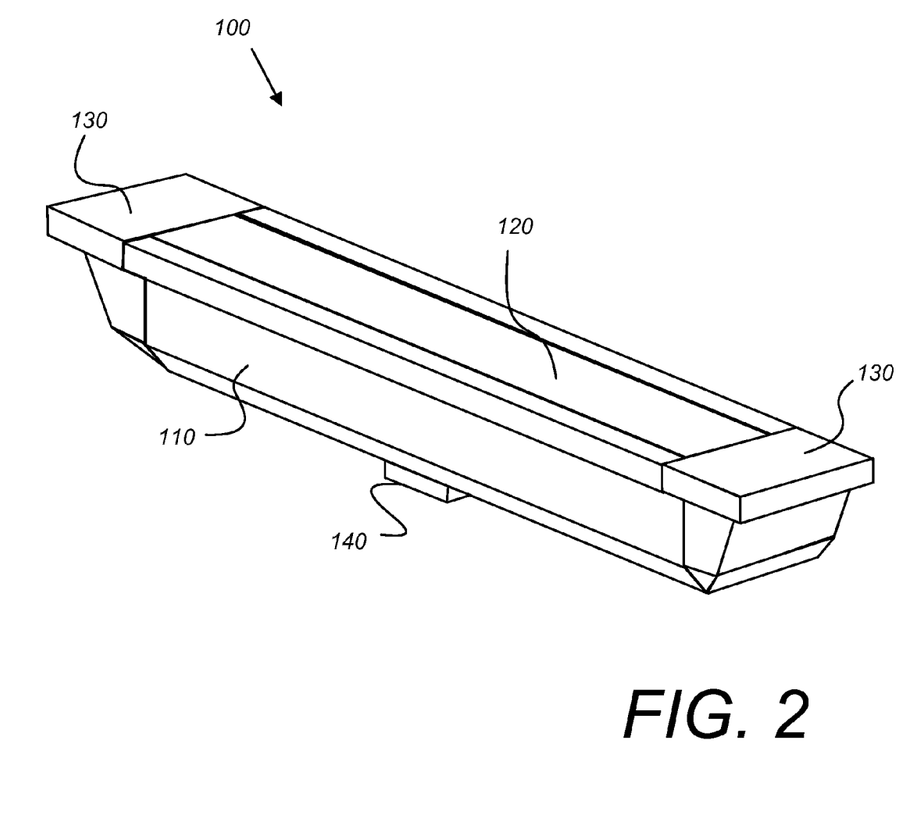
FIG. 2 shows a non-exploded isometric view of one embodiment of an acoustic grain loss sensor.
Figure 3:
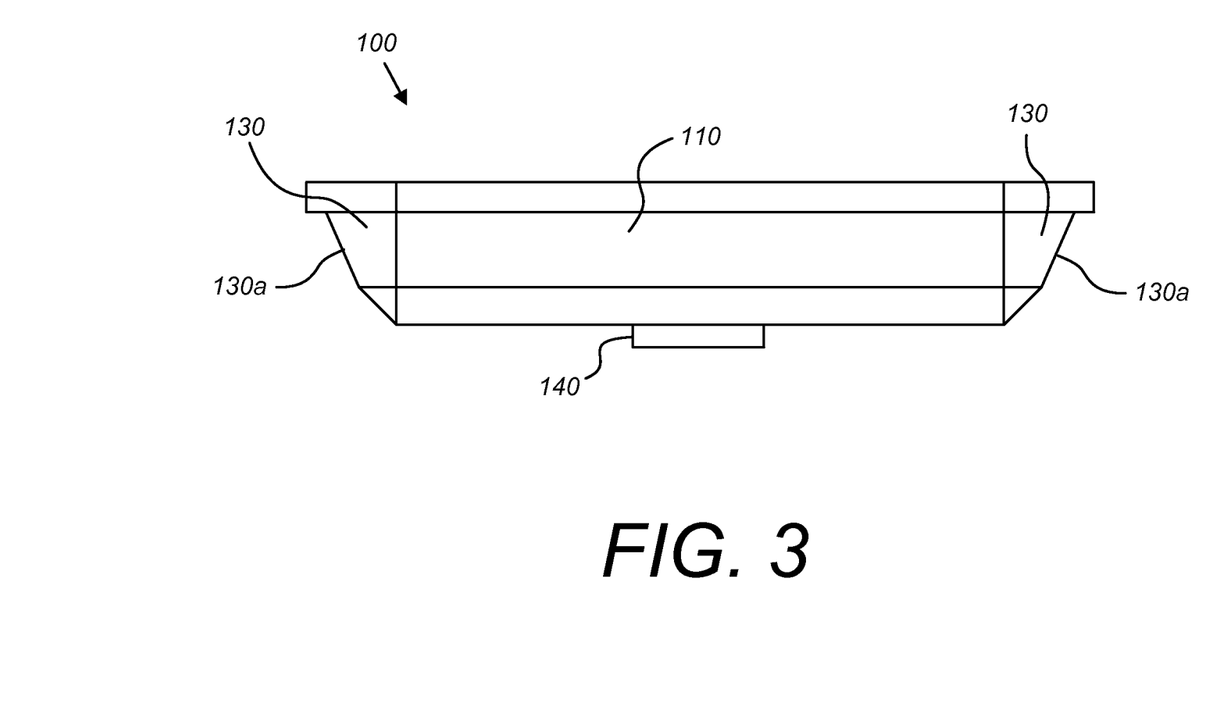
FIG. 3 shows a front view of one embodiment of an acoustic grain loss sensor.

FIG. 2 shows an alternate non-exploded isometric view of the same embodiment of the acoustic grain loss sensor 100 illustrated in FIG. 1, and is provided to show how this embodiment of the acoustic grain loss sensor 100 may appear when fully assembled. FIG. 3 shows a front view of this same embodiment.

The following discussion refers collectively to FIGS. 1, 2, and 3. The general concept behind the acoustic grain loss sensor 100 as shown in FIGS. 1, 2, and 3 is as follows. The acoustic grain loss sensor 100 is mounted on a combine or other agricultural vehicle such that it is located directly in the path of a flow of material. For the grain loss sensor application discussed here, that flow of material is the grain and chaff material that is falling or being blown out of the back of a combine. The acoustic grain loss sensor 100 is mounted such that the sensor strike plate 120 will be directly impacted by the material that is flowing. The impact of the grain (or other material) on the sensor strike plate 120 will generate a ringing sound pattern which will reverberate through the sensor case 110. The design of the sensor case 110 and the sensor end caps 130 are such that the sound waves generated by the impact on the sensor strike plate 120 will be guided toward the electronics module 140, where they will be picked up by the microphone and processed by the electronics present on the module (as discussed and illustrated in later figures).

In one embodiment, the sides 130a of the sensor end caps 130 are designed to be slanted, so that they will not reflect sound waves directly back toward the opposite side 130a. Sensor end caps 130 with perpendicular and parallel sides 130a will likely cause sound waves to bounce back and forth, creating and propagating a standing wave which would cause erroneous readings leading to misidentification of the material hitting the sensor strike plate 120.

The technical design of the acoustic grain loss sensor 100 is crucial to its performance. The materials used for the sensor strike plate 120, sensor case 110, and sensor end caps 130, as well as the internal and external geometry of these components, will determine the frequency and wavelength of the sound waves created inside the sensor 100 by an impact on the strike plate 120. The choice of materials can be made in order to "tune" the frequency of the sound waves being detected by the electronics module 140. Ideally, the acoustic grain loss sensor 100 design will be used to tune the range of frequencies detected by various kinds of impacts on the strike plate 120 such that the frequencies can be easily isolated from the background noise of the combine and the environment.

One preferred material used for the sensor strike plate 120 is a sheet of stainless steel. This material stands up well to the environmental challenges inherent in a combine (dust, humidity, rocks, etc.) and passes sounds well into the acoustic grain loss sensor 100. The thickness of the strike plate 120 can be controlled to change the frequency characteristics of the sounds waves generated. Of course, any appropriate material which can absorb impacts and survive the environment can be used for the sensor strike plate 120.

The sensor case 110 may be constructed from a flat sheet of metal, or may be molded or cast into its final shape. In one alternate embodiment, if the sensor case 110 is molded from a plastic material, it would be possible to also directly mold the end caps 130 into the case 110, such that both case 110 and end caps 130 are combined into a solid piece.

The materials selected for the sensor case 110 and sensor end caps 130 will be such that the desired frequency response range is generated. Any appropriate material may be used to achieve this response range. One skilled in the art will recognize that various form factors and geometries can be used to modify the performance of the acoustic grain loss sensor 100, with the critical factor being how the sound waves are directed into the electronics module 140.

In one embodiment of the acoustic grain loss sensor 100, a gasket or sealant material would be used between the sensor strike plate 120, sensor end caps 130, electronics module 140, and the sensor case 110, such that an airtight seal is created. This airtight seal would limit the amount of "noise" generated by the movement of air (caused by the environment or moving equipment) throughout the sensor 100.

Figure 4:
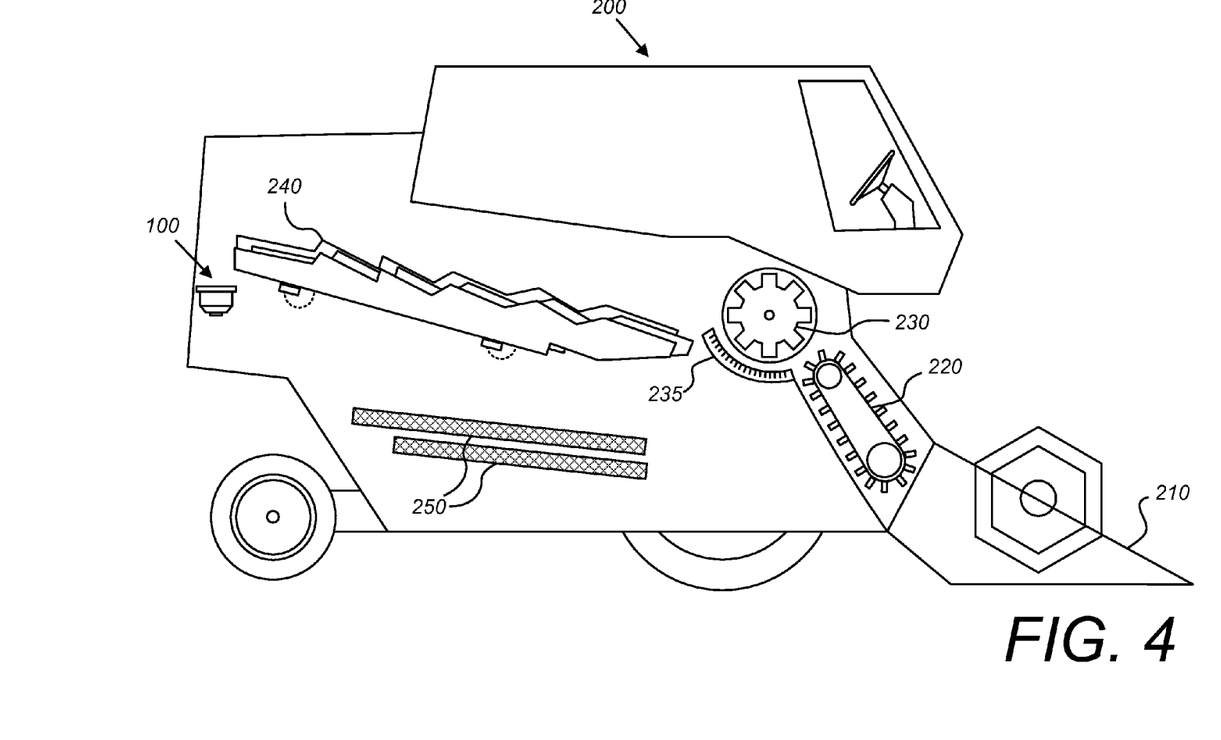
FIG. 4 shows a side view of a combine, showing the main internal components and one possible mounting location for an acoustic grain loss sensor.

FIG. 4 shows a side view of a combine, showing the main internal components and one possible mounting location for the acoustic grain loss sensor 100 of FIGS. 1, 2, and 3. A typical combine 200 drives through a field in order to harvest the crop. As the combine 200 moves through the crop, the crop is pulled into the header 210 which cuts the crop and pulls it up inside the combine 200. Once past the header 210, the crop is pulled further into the combine 200 by a belt or auger 220. The crop passes between a rotor 230 and a concave 235, where the grain is separated from the rest of the plant by a rubbing or friction between the rotor 230 and concave 235. Most of the grain falls through openings in the concave 235 and lands on sieves 250, which act as filters to further separate additional non-grain material (chaff) from the grain before the grain drops through the sieves 250 and is collected by augers 220 which transport it to a grain tank (not shown in FIG. 4, but shown in later figures). Most of the non-grain material (chaff) that comes out of the concave 235 is thrown up on the straw walkers 240, which are a series of separately moving conveyors which move in a cyclic pattern and which move the chaff toward the back of the combine 200. Air is blown up through the sieves 250 and straw walkers 240 in order to blow the lighter chaff up and toward the back of the combine 200 while the heavier grain particles fall through the straw walkers 240 and sieves 250 to be collected for transport to a clean grain tank.

In the embodiment shown in FIG. 4, the acoustic grain loss sensor 100 is mounted behind the straw walkers 240, such that any grain that is being lost out the back of the combine 200 (instead of falling through the walkers 240 and sieves 250) will impact the sensor and be detected. More than one acoustic grain loss sensor 100 may be mounted on the combine 200 in other locations where grain is being lost. Alternately, the size of the acoustic grain loss sensor 100 may vary. One longer sensor 100 may be used to cover the entire width of the back of the combine 200, or two or more sensors 100 may be used to each cover a portion of the distance. In one embodiment, each straw walker 240 could have its own acoustic grain loss sensor 100 mounted directly to it, such that the sensor 100 moves back and forth in a reciprocating path along with its corresponding straw walker 240, to maximize the amount of grain loss it sees.

Figure 5:
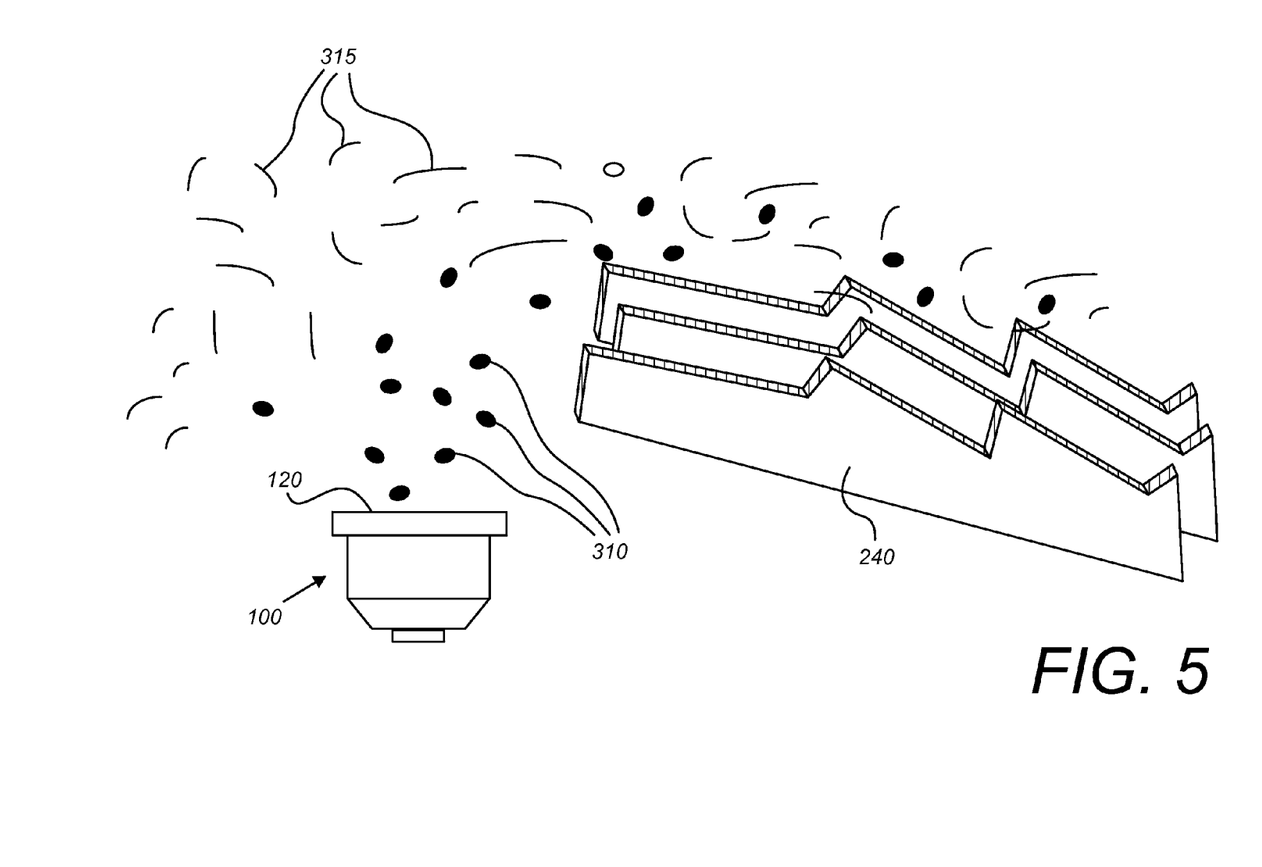
FIG. 5 shows a close up view of the ends of the straw walkers in a combine in relation to an acoustic grain loss sensor, showing how grain and chaff material may strike the sensor.

FIG. 5 shows a close up view of the ends of the straw walkers 240 in the combine 200 in relation to an acoustic grain loss sensor 100, showing how material may strike the sensor. Since chaff 315 is lighter than grain 310, most of the chaff 315 is blown off of the straw walker 240 such that it falls beyond the acoustic grain loss sensor 100. The heavier grain 300, however, falls closer to the ends of the straw walkers 240, and thus mostly impacts the sensor strike plate 120 of the acoustic grain loss sensor 100. It is likely that some grain 310 will fall beyond the sensor 100, and some chaff 315 will fall on the sensor 100, so it may be important for the sensor to be able to distinguish between the impact of a lighter material and that of a heavier one.

Figure 6A:
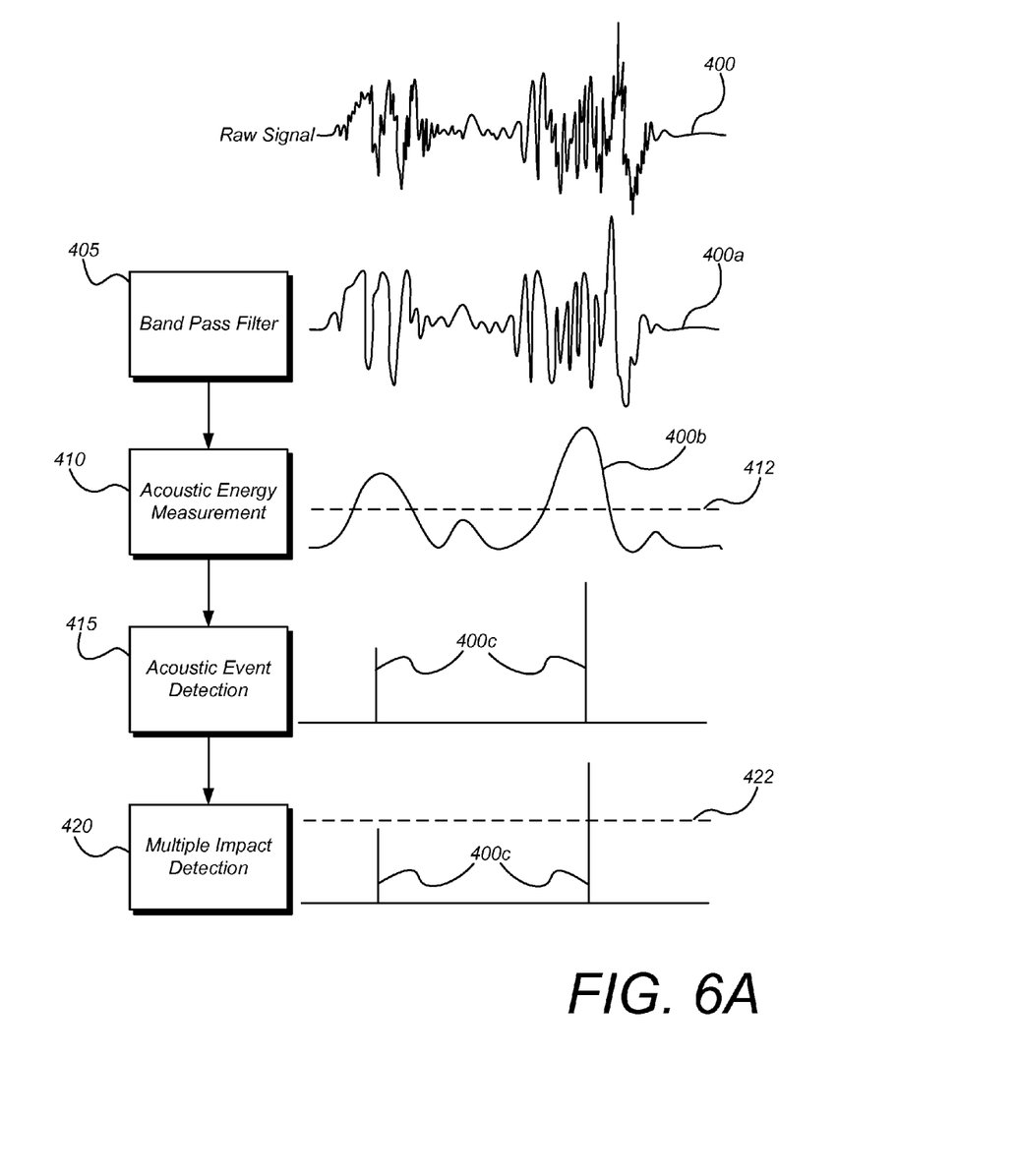
FIG. 6A shows a flowchart for a simplified version of one embodiment of an algorithm that may be used to process the acoustic signals detected by an acoustic grain loss sensor.

FIG. 6A shows a flowchart for a simplified version of one embodiment of an algorithm that may be used to process the acoustic signals detected by an acoustic grain loss sensor. A raw signal 400 is created when the microphone on the electronics module 140 detects the sound waves created by impacts on the acoustic grain loss sensor 100. This raw signal 400 is likely characterized by a lot of noise that makes the signal 400 difficult to process. Therefore, the raw signal 400 is first passed through a band pass filter 405 to remove some of the noise that does not fit a particular frequency range (as determined by the design of the acoustic grain loss sensor 100). The result is a filtered signal 400a that is much cleaner but which still does not clearly show grain impacts from chaff impacts and other ambient noise. The filtered signal 400a is then run through an acoustic energy measurement process 410, during which each point on the filtered signal 400a is squared to create its absolute value and the filtered signal 400a is further processed to create signal 400b, which contains distinguishable "hills" representing impact energies (that is, representing individual impacts of some kind on the sensor strike plate 120).

In step 415, an acoustic event detection is performed by determining which of the hills in the 400b signal rise above a predetermined threshold 412, which indicates that those locations represent peaks 400c which can be associated with impacts that were very likely caused by grain. Those hills in 400b which fall below the threshold 412 are likely caused by impacts related to chaff.

Finally, a multiple impact detection step 420 is performed, which further processes the peaks 400c to determine if they rise above a second predetermined threshold 422. Those peaks 400c which rise above threshold 422 are likely caused by the impacts of two or more grains striking at the same time (increasing the sound noise generated over a single strike). These multiple grain impacts can be taken into account when determining the amount of grain loss.

Figure 6B:
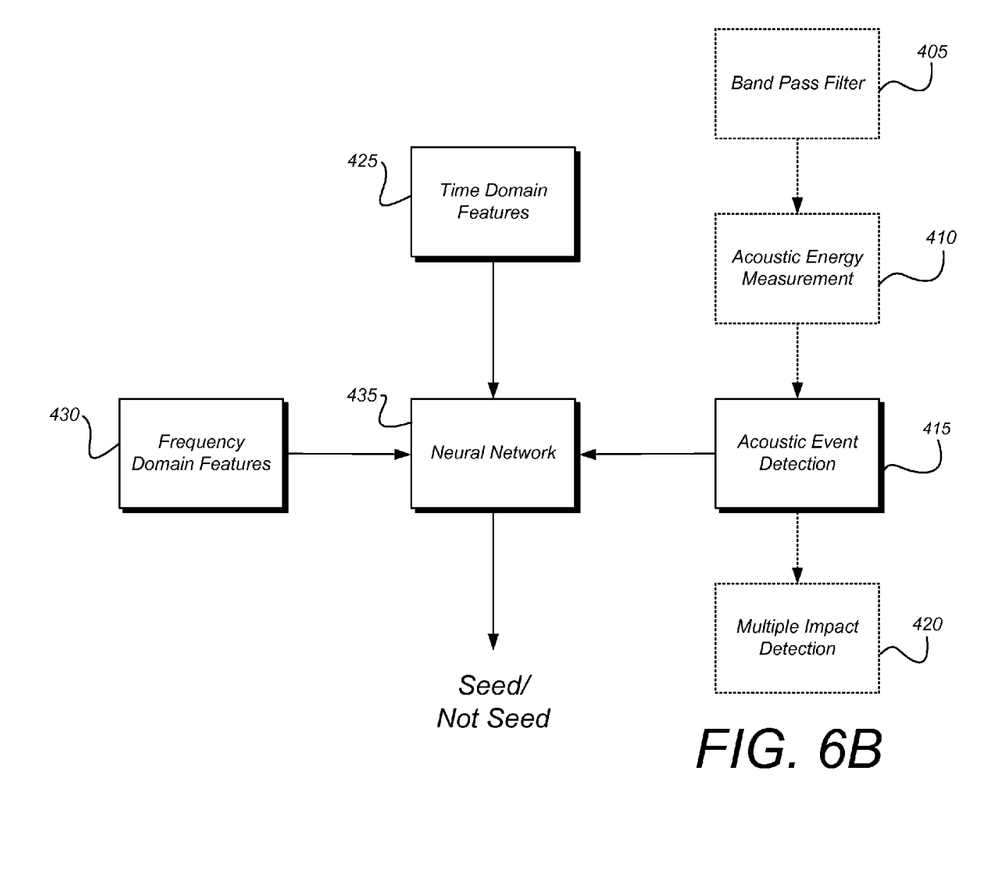
FIG. 6B shows a flowchart for a more complex version of one embodiment of an algorithm that may be used to process the acoustic signals detected by an acoustic grain loss sensor.

FIG. 6B shows a flowchart for a more complex version of the algorithm from FIG. 6A. In parallel with steps 405, 410, 415, and 420 (as shown on FIG. 6A), additional steps are added to better identify the source of the impact signals. Information based on the time domain features 425 (such as the zero crossing rate of the raw data signal 400) is combined with information based on the frequency domain features 430 (such as the short term fast Fourier transform of the variance of the raw data signal 400) and the acoustic event detection process 415. This information is fed into a neural network 435 which uses this information, along with stored information related to impact profiles for various grain types, chaff types, and MOG (material other than grain) types, to determine if the impact was caused by a seed or something other than a seed. Although the steps provided in FIG. 6A are likely adequate to provide a reasonable grain loss measure, these additional steps can provide more detailed information.

It should be noted that the steps shown in FIGS. 6A and 6B are not meant to be limiting in any way, and that various other steps could be added or substituted for the steps shown in these figures. These figures are meant to be indicative of the types of processing that can be done by an acoustic grain loss sensor.

Figure 7:
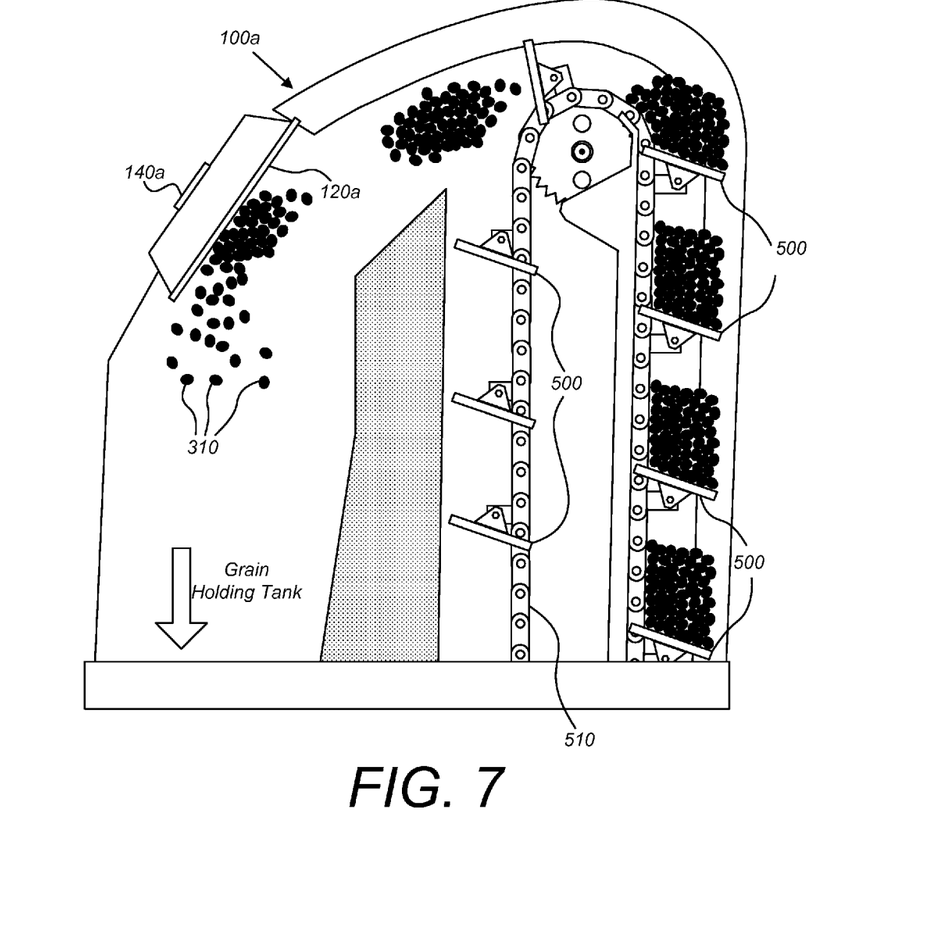
FIG. 7 shows an alternate embodiment of the acoustic sensor being used as a yield sensor, to detect the amount of grain entering the grain tank on the combine.

FIG. 7 shows an alternate embodiment of the acoustic sensor being used as a yield sensor, to detect the amount of grain 310 entering the grain tank on the combine 200. FIG. 7 shows an interior view of the clean grain elevator in a combine. Paddles 500 mounted on a chain drive 510 move grain particles 310 up into a grain elevator. The paddles 500 eject the grain particles 310 at the top of their travel, and the grain particles 310 fly into an entry way for a grain holding tank. An acoustic yield sensor 100a is mounted in the entry way such that the grain particles 310 impact the yield sensor's strike plate 120a before being deflected down into the grain holding tank. The impact of the particles 310 on the strike plate 120a creates sound waves in the sensor 100a which are detected and processed by the electronics module 140a.

The physical construction of the acoustic yield sensor 100a is almost identical to that of the acoustic grain loss sensor 100 of earlier figures, except that it is configured to fit in the grain holding tank entry way and designed acoustically to be optimized for this application. However, the main components shown in FIGS. 1, 2, and 3 for the acoustic grain loss sensor 100 should have their counterparts in the design of the acoustic yield sensor 100a.

The processing required for the acoustic yield sensor 100a, however, will likely be different than that required for the acoustic grain loss sensor 100. For the acoustic grain loss sensor 100, the goal was to isolate individual impacts and to determine if they matched a certain profile (to see if they were grain or MOG). This required processing the signals in the time domain for the grain loss sensor 100. For the acoustic yield sensor 100a, the material is nearly 100 percent pure grain and impacting the yield sensor 100a at a significantly higher rate, which is an almost continuous flow of material. The processing for the yield sensor 100a signals, therefore, is best done in the frequency domain, and the incoming data will represent the "sound power" of the impact. This approach is similar to that taken by the inventors in the related U.S. patent application Ser. No. 13/046,549, entitled "Air Seeder Monitoring and Equalization System Using Acoustic Sensors" by Gelinske et al. This application is therefore included herein in its entirety by reference.

Figure 8:
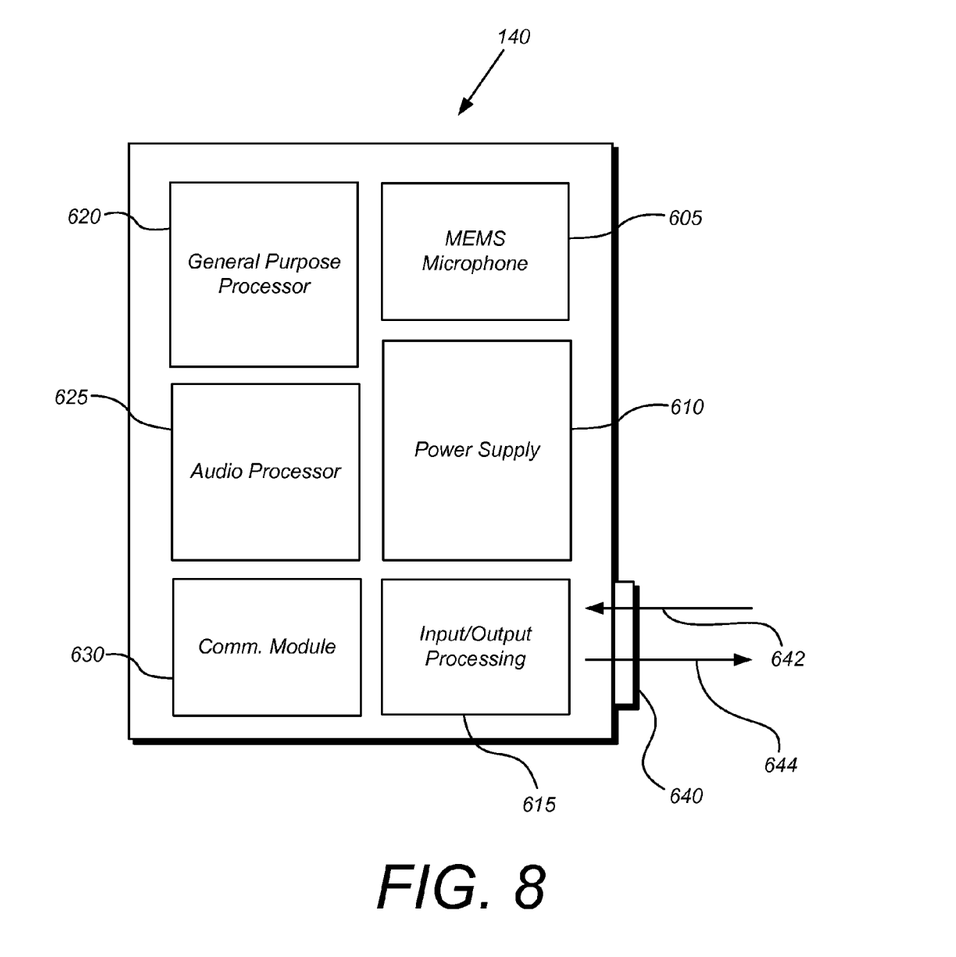
FIG. 8 is a simplified block diagram of one possible embodiment of an electronics module for use in an acoustic sensor.

FIG. 8 is a simplified block diagram of one possible embodiment of an electronics module 140 for use in an acoustic sensor. A key component in the electronics module 140 is the MEMS (micro-electro-mechanical system) microphone 605, which is mounted on a printed circuit board (PCB) within the electronics module 140. The microphone 605 picks up sound created by the impacts of particles on the sensor strike plate 120. A general processor 620 is provided to handle routine tasks within the electronics module 140, such as executing the operating system tasks required to run the system. A special audio processor 625 is provided specifically for processing the audio signals received by the acoustic sensor (either 100 or 100a, or any alternate version thereof). In the preferred embodiment, the audio processor 625 is a high-end audio frequency processor, ideally suited for processing the frequency-based audio data captured from the acoustic sensors 100/100a.

A communications module 630 is responsible for sending messages to and receiving messages from other parts of the combine, such as a display in the combine cab. These messages could be in any appropriate format, but are likely sent in an industry standard protocol such as CAN (Controller Area Network).

A power supply circuit 610 processes and filters the power input to the module 140, and steps the voltages up or down for subcircuits as necessary. An input/output processing circuit 615 is responsible for handling any inputs 642 that may come into the module 140 or outputs 644 that may be sent by the module 140. These inputs 642 and outputs 644 may be any number of items, including signals from external systems including power inputs. The inputs 642 and outputs 644 are routed into the electronics module 140 through one or more connectors 640.

Having described the preferred embodiment, it will become apparent that various modifications can be made without departing from the scope of the invention as defined in the accompanying claims. In particular, the components of the present invention, described herein and in the accompanying drawings, may be used in different configurations and combinations than described in the examples described above.

Having thus described the invention, what is claimed as new and desired to be secured by Letters Patent is:

1. A system for acoustically detecting and quantifying bulk material, which said system comprises:
   an impact sensor including a sensor case enclosing a sensor interior;
   said sensor case mounting a strike plate adapted for striking by the bulk material;
   said strike plate communicating acoustically with said sensor interior;
   an acoustic device communicating acoustically with said sensor interior and adapted for providing an output signal in response to bulk material striking said strike plate;
   a processor connected to said acoustic device and adapted for receiving and processing said acoustic device output signals;
   said acoustic device comprising a transducer adapted for converting acoustic energy to an electrical signal;
   said transducer comprising a micro-electro-mechanical system (MEMS) microphone;

a bandpass filter connected to said microphone and adapted for filtering bulk material impact for conversion to electrical output signals from said sensor;

an acoustic energy measurement device connected to said bandpass filter, an acoustic event detection device connected to said energy measurement device and a multiple impact detection device adapted for processing strikes by multiple bulk material pieces;

wherein said processor includes a time domain function adapted for identifying an acoustic energy signal source;

wherein said processor includes a frequency domain function adapted for identifying an acoustic energy signal source;

a neural network connected to said processor and adapted for providing output corresponding to the presence or absence of a bulk material impact said sensor case having an elongated, channel-shaped body with a top opening and opposite ends;

said sensor case having a pair of end caps each attached to a respective sensor case end;

each said end cap enclosing a respective end cap space forming a part of said sensor interior; and said strike plate being mounted on said sensor case in covering relation over said top opening.

2. The system according to claim 1, which includes: a communication module connected to said processor.

3. The system according to claim 2, which includes:
an input/output (I/O) processing module connected to said processor.

4. The system according to claim 1, which includes:
said strike plate having a generally rectangular configuration with opposite side edges;
said sensor case forming a pair of slots each located along a respective side of said top opening; and
said sensor case slots receiving said strike plate side edges with said strike panel mounted in covering relation over said sensor case interior.

5. A method of detecting and quantifying bulk material in bulk material handling equipment with a material intake, a material discharge and a material flow path between said intake and discharge, which method comprises the steps of:
providing an impact sensor with a sensor case enclosing a sensor interior;
providing said impact sensor with a strike plate mounted on said sensor case;
providing said impact sensor with an acoustic device;
mounting said acoustic device in acoustic communication with said sensor interior;
impacting said strike plate with bulk material and producing acoustic energy in said sensor interior;
providing an output signal from said acoustic device corresponding to acoustic energy in said sensor interior;

providing a digital processor connected to said acoustic device;
processing said output signal and identifying bulk material impacts on said strike plate;
providing output corresponding to a characteristic of said material flow through said equipment;
converting said acoustic energy to electric energy;
providing a microphone connected to said sensor case for said acoustic device;
providing a bandpass filter connected to said acoustic device;
filtering the output from said acoustic device with said bandpass filter;
providing a multiple impact detection device connected to said acoustic device;
detecting with said multiple impact detection device multiple bulk material impacts;
programming said processor with a time domain function;
identifying an acoustic energy signal source with said time domain function;
programming said processor with a frequency domain function; and
identifying an acoustic energy signal source with said frequency domain function.

6. The method according to claim 5 wherein said acoustic device comprises a micro-electro-mechanical system (MEMS) microphone.

7. The method according to claim 5, which includes additional steps of:
providing a communication module; and
connecting said communication module to said processor.

8. The method according to claim 5, which includes additional steps of:
providing an electronics module including the microphone, the processor and an audio processor connected to the microphone in the processor.

9. The method according to claim 5, which includes the additional steps of:
providing an input/output (I/O) processing module; and
connecting said I/O processing module to said processor.

10. The method according to claim 5, which includes the additional step of soundproofing said sensor case.

11. The method according to claim 5, which includes the additional step of:
directing sound waves within a sensor case carrier to said acoustic device.

12. The method according to claim 5, which includes the additional step of:
tuning said sensor case to a frequency range corresponding to the impact of said bulk material on said strike plate.

* * * * *